United States Patent [19]

Harding et al.

[11] 4,020,518
[45] May 3, 1977

[54] AUTO TIRE CLEANING APPARATUS

[76] Inventors: Maurice R. Harding, 8540 SW. Spruce St., Portland, Oreg. 97223; David D. Teeney, 14334 NE. Sandy Blvd., Portland, Oreg. 97230

[22] Filed: June 7, 1976

[21] Appl. No.: 693,644

[52] U.S. Cl. .............................. 15/53 B; 15/DIG. 2
[51] Int. Cl.² ......................................... B60S 3/04
[58] Field of Search ............ 15/DIG. 2, 53 R, 53 B

[56] References Cited

UNITED STATES PATENTS

| | | | |
|---|---|---|---|
| 2,837,759 | 6/1958 | Haverberg | 15/53 B |
| 2,975,446 | 3/1961 | Furman et al. | 15/53 B |
| 3,561,031 | 2/1971 | Gusse et al. | 15/53 B |

*Primary Examiner*—Edward L. Roberts
*Attorney, Agent, or Firm*—James D. Givnan, Jr.

[57] ABSTRACT

An apparatus including a brush assembly positionable toward and away from a vehicle wheel which assembly cleans the vehicle tire sidewall by oscillatory brush motion. A base supports extensible carrier means on which the brush assembly moves while actuators impart outward and inward movement to the brush assembly. Continuous means regulates the travel of the telescopic carriers to obviate any tendency of same to bind. A wheel brush cleans the metal wheel and hub cap of each wheel assembly.

21 Claims, 9 Drawing Figures

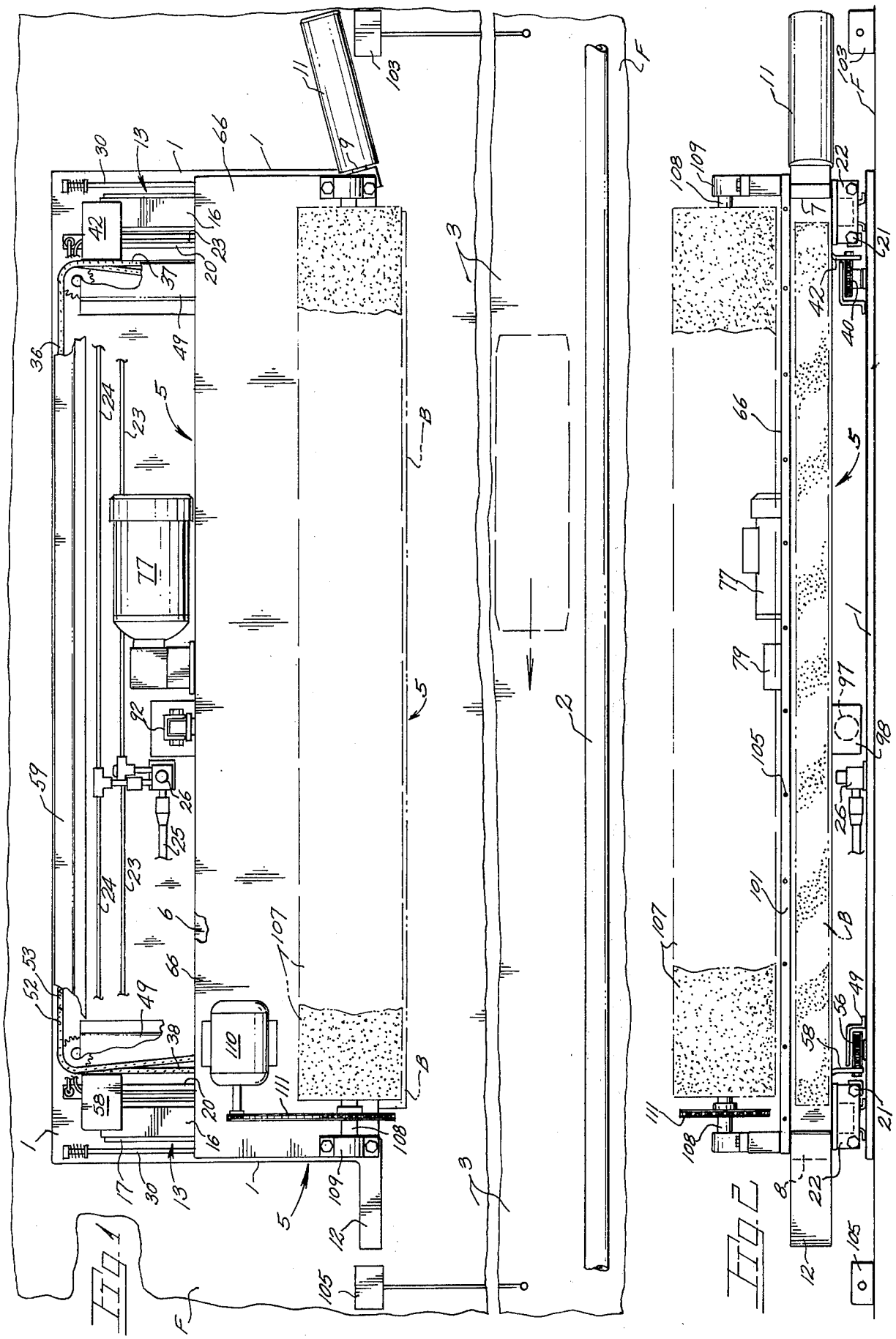

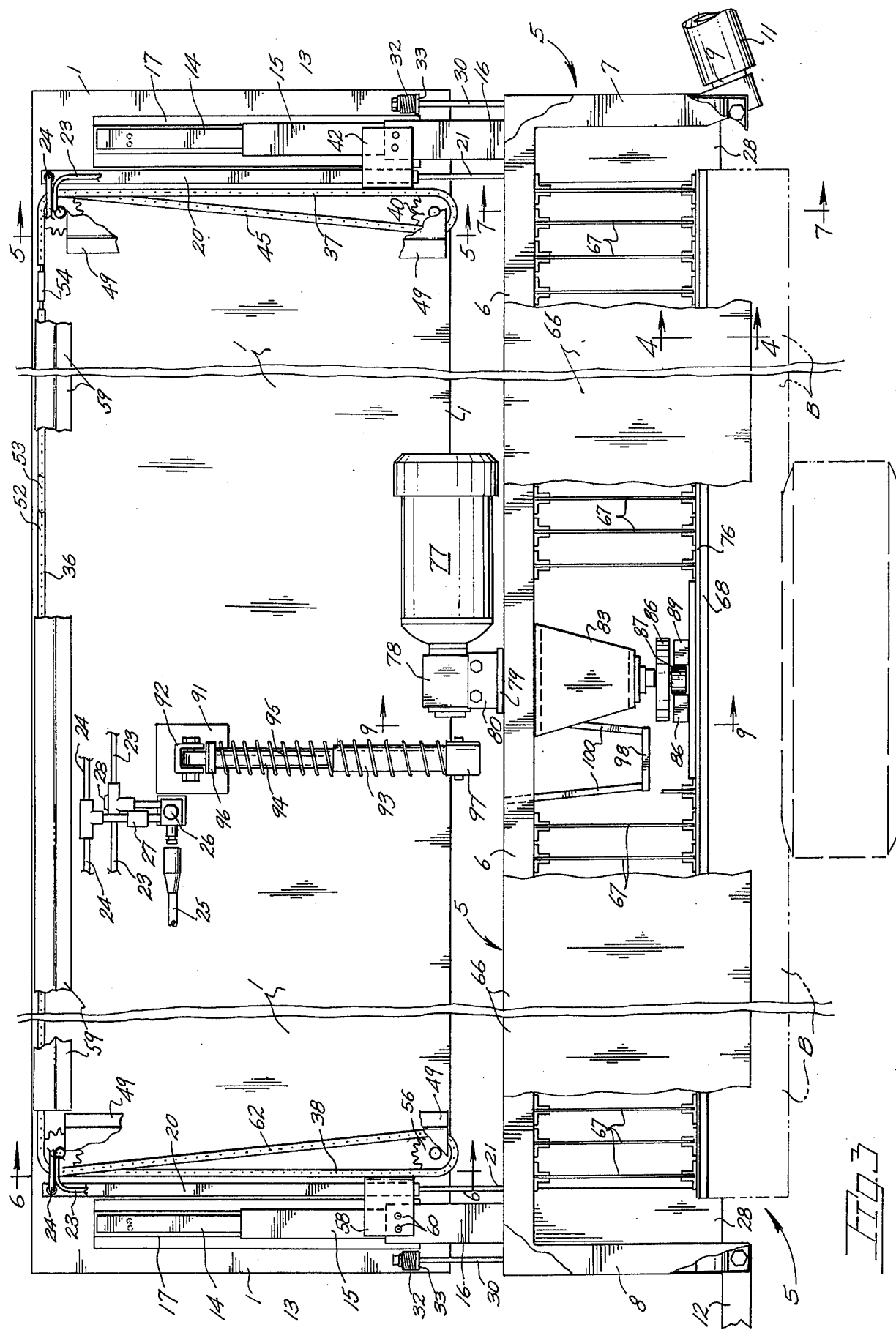

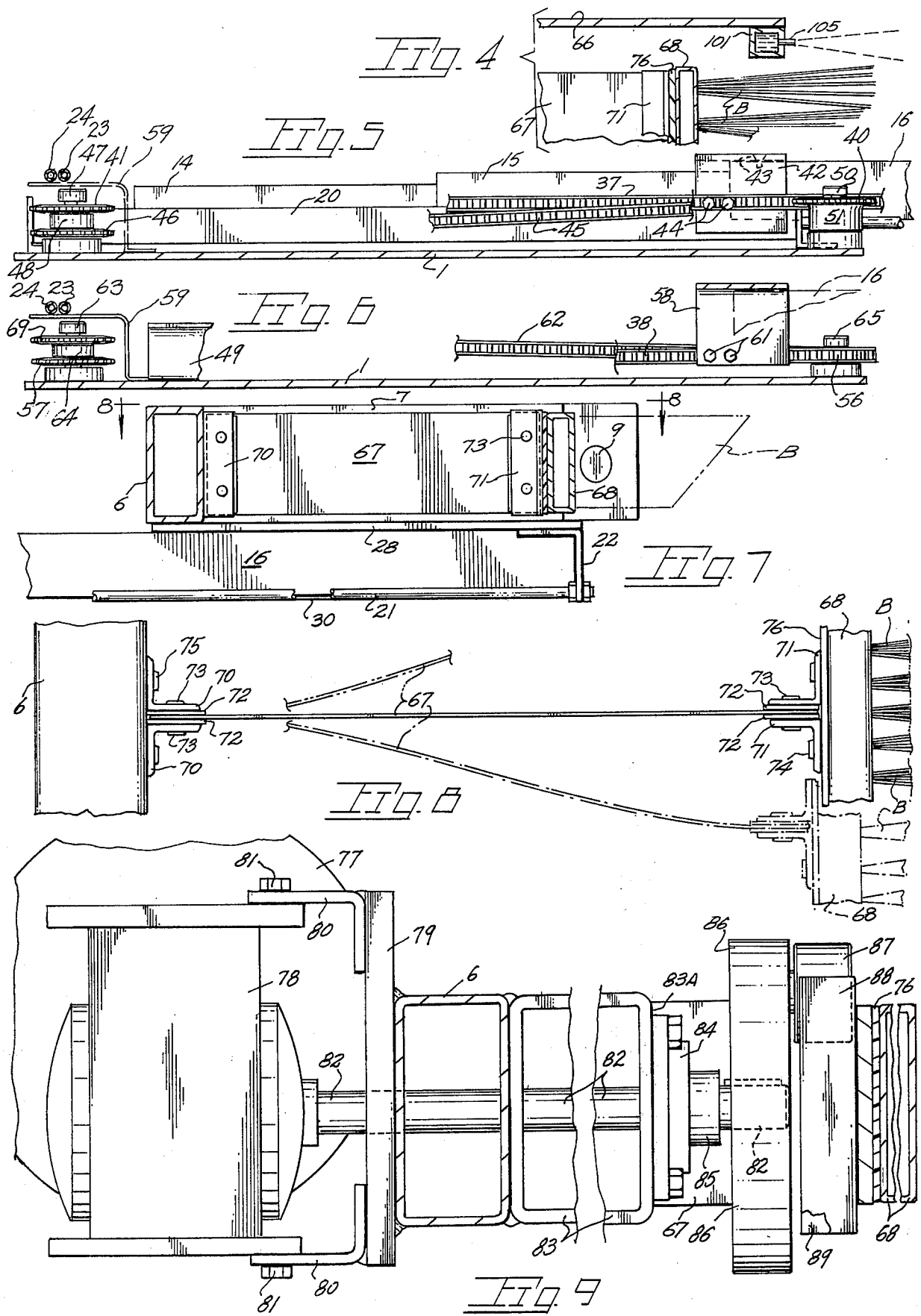

AUTO TIRE CLEANING APPARATUS

BACKGROUND OF THE INVENTION

Automated car cleaning establishments commonly include equipment for the scrubbing of vehicle tire sidewalls. Various types of equipment have been devised to engage and clean tire sidewalls as a vehicle advances through the installation. One such known device comprises a cylindrical brush which rotates about a horizontal axis parallel to and offset from the car centerline with the tire sidewall being subjected to bristles rotating in a vertical path. Other devices make provision for applying power to the vehicle wheels via powered rolls to spin same while a brush is advanced thereagainst. The latter type of wheel cleaning apparatuses are costly in view of the complex roll drive mechanism required and further undesirably subject certain types of vehicle differentials to severe forces. The first mentioned cylindrical wheel cleaner, while less complex, does not accomplish a thorough cleaning of the sidewall as the cylindrical brush is not effective to thoroughly clean the oppositely curved sidewall surface. Other disadvantages of known tire cleaning equipment reside in their complexity, size and floor alteration required for installation purposes.

SUMMARY OF THE INVENTION

The present invention is embodied in a tire cleaning apparatus having a brush component which moves in an oscillating manner to clean the tire sidewall.

The brush assembly is positionable toward the auto so as to engage the passing tire during which time the brush is actuated. A base of the present apparatus is secured to the floor adjacent the vehicle path. Carrier means for the brush assembly enables movement of the latter assembly toward and away from the path of the vehicle's tires with scrubbing of the tire sidewall being accomplished by rapid back and forth movement of the brush bristles. A brush of elongate shape is utilized to assure effective cleaning of the entire tire sidewall. Importantly, the brush assembly includes flexible connectors to support the brush member for oscillatory movement. Means associated with the brush back receive oppositely directed forces to permit reciprocation of the lightweight brush in a rapid manner. The brush assembly may additionally include a second brush component for washing auto wheels.

Important objectives of the present tire cleaning apparatus include; the provision of such an apparatus having a brush component which moves back and forth in a rapid manner to thoroughly clean a tire sidewall without requiring spinning of the tire by power driven rolls; the provision of such an apparatus of compact design compatible from a space standpoint with other car washing equipment of the car wash installation; the provision of unitary apparatus not requiring costly modification of the floor structure; the provision of a tire washing apparatus which lends itself to use in conjunction with a second brush member for washing auto wheels and hubcaps; the provision of a tire cleaning apparatus having a fluid chamber extending therealong with outlet ports directing fluid streams against the tire and wheel.

BRIEF DESCRIPTION OF THE DRAWINGS

In the accompanying drawings:
FIG. 1 is a plan view of the apparatus;
FIG. 2 is a front elevational view of FIG. 1;
FIG. 3 is a plan view of the apparatus with the brush assembly extended into tire contact and with the apparatus sectioned for illustrating purposes;
FIG. 4 is a vertical section taken along line 4—4 of FIG. 3 showing a fluid chamber of the brush assembly;
FIG. 5 is a vertical section taken along line 5—5 of FIG. 3 showing one portion of means for synchronizing brush travel;
FIG. 6 is a view similar to FIG. 5 taken along line 6—6 of FIG. 3 showing another portion of means for synchronizing brush assembly travel;
FIG. 7 is a vertical section view taken along line 7—7 of FIG. 3 showing brush assembly details;
FIG. 8 is an enlarged plan view taken along line 8—8 of FIG. 7 with connector and brush travel extremes shown in broken lines; and
FIG. 9 is a vertical sectional view taken along line 9—9 of FIG. 3 of means for imparting oscillating motion to the brush assembly.

DETAILED DESCRIPTION OF THE PREFERRED EMBODIMENT

With continuing reference to the accompanying drawings, the applied reference numeral 1 indicates a base of the present tire cleaning apparatus for disposition on a floor surface of a car washing establishment adjacent the path of a vehicle's front and rear wheel assemblies on one side of the vehicle being washed. A like companion apparatus (not shown) is located on the opposite side of the vehicle course for the other front and rear wheels which apparatus is substantially the same as that described with differences as later noted. The term wheel as hereinafter used identifies the metallic component of a vehicle wheel assembly.

With reference again to base 1, the same is of plate construction suitably affixed to a floor F as is a wheel guide bar at 2. Per FIG. 1, the apparatus is horizontally offset from said guide bar a distance to permit the passage therebetween along a pathway 3 of automobile and truck wheel assemblies of vehicles having a wide variety of track dimensions. A remaining wheel guide is offset from a like or companion tire cleaning apparatus a lesser distance to confine one set of front and rear wheels of each auto for travel more or less along a common path.

A positionable brush assembly is indicated generally at 5 and includes a frame member 6 which is advanced and retracted, by later described means, toward and away from the front and rear wheel assemblies of a passing auto. Frame member 6 is shown as being of wide U-shaped configuration having opposite end segments 7 and 8 and an intermediate segment. A wheel contacting roller 11 is supported at one end of a frame mounted spindle 9 while the opposite end of the frame terminates in an outwardly projecting end segments 12. Further details of brush assembly 5 are hereinafter provided.

Brush assembly carrier means interconnected the brush assembly 5 with base 1 in a manner enabling extensible and retractive movement of said brush assembly. With attention now to FIG. 3, the carrier means includes telescopic extensible assemblies generally at 13 at each end of base 1. The assemblies may be of conventional construction each including a stationary section 14, an intermediate section 15 and an outer section 16. Inverted channels at 17 serve to mount the two stationary sections 14 to the base while the outer sections 16 of each telescopic assembly jointly support brush assembly 5 on their upper, forward surfaces as best viewed in FIG. 7. Each telescopic assembly 13 includes internal rollers which cooperate with internal ways on the sections. The present brush assembly carrier means above described is desirable from the standpoint of economy of space which is critical in most car wash establishments. One such acceptable set of telescopic assemblies is manufactured and sold by Chassis-Trak, Inc., of Indianapolis, Indiana.

Imparting motion to brush assembly 5 for travel toward and away from passing auto wheels are a pair of double acting actuators at 20 each suitably bracketed in place on base 1 adjacent a base end. The actuators are desirably air operated and of a rectangular section having a barrel within which a piston and associated piston rod 21 move. With attention to FIGS. 2 and 7, the forward end of each piston rod 21 terminates in attachment to a bracket 22 depending from a plate 28 secured to the underside of brush frame 6. Pressurized air may be directed to both the rod ends (front) and blank ends (rear) of the double acting actuators 20 via pairs of branched air lines 23–24. With attentionagain to FIG. 3, the front and rear pair of air lines 23–24 are in controlled communication with a source of pressure shown as a hose 25 via a four way, solenoid actuated valve 26 with a reducing valve at 27 provided in branched air lines 24 for controlled extension of actuator piston rods 21 and hence controlled advancement of brush assembly 5. A quick exhaust valve at 28 serves to vent the front set of air lines 23 upon solenoid valve 26 being actuated to direct air to rear pair air lines 24. Differential pressures within the rod and blank ends of the actuators permits rapid brush assembly retraction away from the auto wheel while advancement of said assembly toward a passing wheel assembly is at a reduced rate to avoid brush damaging biased contact with the tire sidewall. For purposes of avoiding impacting of the rail sections against their respective internal stops, resilient stops are provided in the form of rod members 30 in bolted securement at 31 to earlier described brush frame bracketes 22. The rods are each provided at their rearward ends with a spring 32 which compresses upon a washer element on the rod coming into abutment with a base mounted bracket 33 during forward travel of the brush assembly.

To assure synchronous travel of the ends of brush assembly 5 and thereby avoid binding loads on the brush carrier rail assemblies, synchronizing means are provided in the form of a continuous roller chain 36. With attention to FIGS. 3, 5 and 6 roller chain 36 has forwardly extending segments at 37 and 38 each segment parallel to and interconnected respectively with their adjacent telescopic assembly 13. The chain segments 37 and 38 move forwardly and rearwardly in concert to assure synchronized extension and retraction of assemblies 13. As shown in FIG. 5, chain segment 37 extends between front and rear idler sprockets 40 and 41 located within a common plane with idler sprocket 41 being one of a pair of idler sprockets the other of same indicated at 46. Run or segment 37 is interconnected with outermost telescopic section 16 by an angle plate 42 and fasteners 43. The chain is coupled to plate 42 by fasteners indicated at 44. A return chain run at 45 is reversed about front sprocket 40 and extends, in a downwardly inclined manner rearwardly for entrainment about rear idler sprocket at 46 of the rear pair of sprockets. Rear idler sprockets 41 and 46 are independently journalled on a pedestal supported spindle 47 with a spacer 48 therebetween while front idler sprocket 40 is rotatably mounted on a spindle 50 supported by a base mounted pedestal. A hub 51 elevates front sprocket so as to be coplanar with rear sprocket 41 with chain segment 37 therebetween being substantially horizontal.

Extending along the back of base 1 are upper and lower chain runs 52 and 53 of chain 36 which may include an adjustable chain tensioner at 54. Chain guards at 49 and 59 conceal the moving chain runs.

With attention to FIG. 6 wherein a similar chain arrangement at the opposite end of base 1 is disclosed for controlling extension of the remaining telescopic assembly, horizontal run 38 of roller chain 36 extends between front and rear idler sprockets at 56 and 57 the latter, along with a sprocket at 69, comprises another pair of sprockets. An angle plate 58 interconnected run 38 with outermost section 16 of remaining telescopic assembly 13. Fasteners 60 as seen in FIG. 3, secure plate 58 to the section and additional fasteners at 61 (FIG. 6) join the chain run to plate 58. A return segment of chain at 62 extends from forwad sprocket 56 rearwardly in an upwardly inclined manner to second rear idler sprocket 69 about which it is entrained prior to passage, as upper chain run 52, along the rearward edge of base 1. Rear idler sprockets 57 and 69 are independently mounted on a pedestal supported spindle 63 with a spacer 64 between the sprockets. Single front sprocket 56 is also freely rotatable about a spindle 65 supported by a base mounted pedestal.

With attention again to brush assembly 5 and specifically to flexible mounting means for supporting an elongate brush B in a manner permitting rapid oscillatory movement of same to clean a tire sidewall. In FIG. 3 a cover plate 66 of the brush assembly is broken away to disclose a series of horizontally spaced, yieldable connector plates 67 interconnecting a brush back 68 of a brush structure with brush frame 6. The brush back 68 may be of a tubular nature for the purpose of reducing oscillated weight. The material may be briefly described as a fiber reinforced plastic which, when formed in plate configuration 0.050 of an inch thick, is flexible. The plates 67 are approximately a foot or so in length and disposed on edge. Said plates are securely mounted to both the brush frame 6 and the brush back 68 by right angle segments 70 and 71 of a lightweight metal. To isolate the body of each flexible connector 67 from the angle segments, phenolic strips are provided at 72. Rivets at 73 fasten the connector ends to said angle segments. A strip 76 of glass reinforced plastic extends along the inner side of brush back 68 with additional fasteners at 74 attaching each angle segment to said brush back. Fasteners at 75 secure the opposite angel segments to brush frame 6. Accordingly brush back 68 and the bristles tufts B projecting outwardly therefrom are capable of moving in a horizontal lateral direction as illustrated in FIG. 8 with the two extremes of travel shown in broken lines.

A brush power source is provided by an electric motor 77 suitably supported on brush frame 6 by a speed reducer at 78 having at right angularly arranged input and output drive shafts. The speed reducer, as shown in FIG. 9, is secured to brush frame 6 by a mounting plate 79, brackets 80 and fasteners 81. An output shaft 82 of the speed reducer projects forwardly through a box-shaped weldment 83 which includes a forward wall 83A on which is mounted a flange mounted bearing 84. A collar 85 transmits any axial shaft loads to the bearing. In place on the keyed end of output shaft 82 is a cam drive arrangement including a circular plate 86 and a cam roller 87 offset from the plate and shaft axes. Oscillating motion is imparted to the brush back and brush by roller 87 acting alternately on spaced apart blocks 88 and 89 on brush back 68. In some instances it may be desirable to incorporate a source of oscillatory motion directly with the brush back, however a drawback exists therein that the weight of the oscillated brush structure is increased. With a rotational speed of approximately 300 RPM the brush oscillations will be 600 strokes per minute with a stroke of approximately four inches.

A hydraulic load absorbing unit is indicated at 90, mounted at 91 to base 1 with a clevis at 92 which supports the collapsible unit horizontally above base 1 for engatement with the brush assembly during retraction of the latter. A forward member 93 of the unit telescope over a primary member 94 while a spring 95 serves to return forward member 93. An end plate 96 abuts the clevis to hold the unit horizontal to assure positioning of the units outer end 97 for contact by an abutment plate 98 in welded securement by means of hangers 100 wevded to the underside of intermediate brush frame 6.

With attention again to brush assembly 5, the same includes a tubular conduit at 101 in FIG. 4 which extends the length of the forward edge of cover plate 66 in place on the brush frame. Said conduit is provided with nozzles 105 and is in communication with a pressurized source of fluid via a hose member (not shown) through wich a solenoid valve controlled flow passes. Said valve is in electrical circuit with a feeder actuated switch at 103. Similarly air valve 26 is actuated upon closure of contacts in feeler actuated switch 103 to position the brush assembly outwardly while a second feeler actuated switch at 105 also contacted by the vehicle wheel, on the exit side of the apparatus may serve to terminate solenoid actuation by well known circuitry.

Shown in place in FIGS. 1 and 2 on cover plate 66 of the brush assembly is a wheel and hub cap brush 107 having a horizontal shaft 108 journalled in raised pillow block bearings 109 secured to the cover plate and brush frame end segments 7 and 8 therebelow. A motor 110 is also in place on said cover plate and drives brush 107 via a speed reducing sprocket and roller chain drive 111. Motor 110 is in circuit with a source and may be in circuit with motor 77 of the oscillating brush drive to simultaneously drive brush 107 during oscillation of brush B.

A companion tire cleaning apparatus is of similar construction and located on the opposite side of a vehicle course for cleaning the front and rear wheel assemblies of a vehicle. In view of the last mentioned wheel assemblies of all vehicles being closely confined to substantially a common pathway, as earlier mentioned, outward and inward travel of a brush assembly 5 toward and away from a passing wheel assembly is substantially less than the first described apparatus. Accordingly, the actuators and carrier means associated with the oppositely located apparatus may be of lesser stroke. Further the wheel contacting roller as shown in 11 in FIG. 1 would, of course, be located at the approach end of the apparatus.

While we have shown but one embodiment of the invention it will be apparent to those skilled in the art that the invention may be embodied still otherwise without departing from the spirit and scope of the invention.

Having thus described the invention what is desired to be secured under a Letters Patent is:

1. A tire cleaning apparatus comprising in combination,
   a base,
   a brush assembly including,
     a brush frame,
     a brush structure,
     yieldable connectors extending intermediate the brush frame and brush structure,
     means imparting oscillatory movement to said brush structure,
   a carrier means mounting said brush assembly on said base for movement towards and away from the course of a vehicle wheel, and
   means actuating said brush assembly into contact with a vehicle wheel.

2. The tire cleaning apparatus as claimed in claim 1 wherein said carrier means includes extensible assemblies in spaced relationship on the base, continuous means coupled to said assemblies to synchronize extension and retraction movement of the assemblies.

3. The tire cleaning apparatus as claimed in claim 2 wherein said continuous means comprise a roller chain, idler sprockets on said base, segments of said roller chain disposed parallel to said extensible assemblies and each segment coupled to one of said assemblies at an attachment point which moves within a substantially horizontal plane.

4. The tire cleaning apparatus as claimed in claim 3 wherein said roller chain includes upper and lower runs extending lengthwise along said base, spaced apart pairs of upper and lower idler sprockets between which said upper and lower runs extend, front idler sprockets on said base one each offset from each of said pair of idler sprockets, an inclined chain segment extending intermediate each front idler sprocket and one sprocket of each pair of idler sprockets.

5. The tire cleaning apparatus as claimed in claim 1, wherein said brush assembly additionally includes a wheel brush supported by said brush frame.

6. The tire cleaning apparatus as claimed in claim 5 wherein said wheel brush rotates about a horizontal axis.

7. The tire cleaning apparatus claimed in claim 1 wherein said yieldable connectors are of plate configuration.

8. The tire cleaning apparatus as claimed in claim 7 wherein said plates are of resinous fiber reinforced composition.

9. The tire cleaning apparatus as claimed in claim 7 wherein said plates are disposed in a horizontally spaced series.

10. The tire cleaning apparatus claimed in claim 7 wherein said oscillatory means includes a motor in place on said brush frame.

11. The tire cleaning apparatus claimed in claim 10 wherein said oscillatory means additionally includes cam means acting on said brush structure.

12. The tire cleaning apparatus as claimed in claim 10 wherein said carrier means comprises telescopic assemblies having roller equipped sections.

13. In a tire washing apparatus having a base, carrier means on said base supporting a brush assembly for movement toward and away from the course of a vehicle wheel, actuating means positioning said brush assembly, the improvement comprising a brush assembly including a brush frame, elongate brush means, yieldable connectors intermediate said brush frame and said brush, means imparting oscillatory motion to said brush for cleaning a tire sidewall.

14. the improvement claimed in claim 13 additionally including a wheel brush supported by said brush frame.

15. The improvement claimed in claim 14 wherein said wheel brush rotates about a horizontal axis.

16. The improvement claimed in claim 13 wherein said yieldable connectors are of plate configuration.

17. The improvement claimed in claim 16 wherein said plates are of resinous fiber reinforced composition.

18. The improvement claimed in claim 16 wherein said plates are disposed in a horizontally spaced series.

19. The improvement claimed in claim 16 wherein said oscillatory means includes a motor in place on said brush frame.

20. The improvement claimed in claim 19 wherein said oscillatory means additionally includes cam means acting on said brush structure.

21. The improvement claimed in claim 20 wherein said carrier means comprises telescopic assemblies having roller equipped sections.

* * * * *